United States Patent
Ikari et al.

(10) Patent No.: US 7,133,277 B2
(45) Date of Patent: Nov. 7, 2006

(54) ELECTRONIC DEVICE

(75) Inventors: Takeshi Ikari, Aichi (JP); Atsushi Hoshi, Kanagawa (JP); Takuya Hara, Kanagawa (JP)

(73) Assignee: Sony Corporation (JP)

( * ) Notice: Subject to any disclaimer, the term of this patent is extended or adjusted under 35 U.S.C. 154(b) by 115 days.

(21) Appl. No.: 10/606,593

(22) Filed: Jun. 26, 2003

(65) Prior Publication Data
US 2004/0047132 A1    Mar. 11, 2004

(30) Foreign Application Priority Data
Jul. 3, 2002    (JP) .......................... P2002-194455

(51) Int. Cl.
*H02B 1/00* (2006.01)

(52) U.S. Cl. .................. 361/600; 396/287; 396/539; 396/542; 348/333.01; 348/374

(58) Field of Classification Search ................ 348/374, 348/373, 372, 207.99, 335, 333.01; 361/679, 361/600; 396/277, 539, 542, 287
See application file for complete search history.

(56) References Cited

U.S. PATENT DOCUMENTS

| | | | |
|---|---|---|---|
| 5,860,033 A * | 1/1999 | Stanchus et al. ............ 396/176 |
| 6,141,505 A * | 10/2000 | Miyata et al. ............... 396/535 |
| 6,215,964 B1 * | 4/2001 | Omiya ........................ 396/535 |
| 6,295,088 B1 * | 9/2001 | Tsukahara et al. ...... 348/333.06 |
| 6,349,171 B1 * | 2/2002 | Koike ............................ 396/6 |
| 6,374,050 B1 * | 4/2002 | Manabe ....................... 396/106 |
| 6,377,751 B1 * | 4/2002 | Uchiyama ..................... 396/25 |
| 6,445,417 B1 * | 9/2002 | Yoshida et al. .............. 348/374 |
| 6,463,222 B1 * | 10/2002 | Ito et al. ...................... 396/541 |
| 6,473,570 B1 * | 10/2002 | Ito .............................. 396/542 |
| 6,507,712 B1 * | 1/2003 | Mori et al. .................. 396/406 |
| 6,553,188 B1 * | 4/2003 | Tanaka ....................... 396/535 |
| 6,554,497 B1 * | 4/2003 | Kobayashi et al. .......... 396/348 |
| 6,597,874 B1 * | 7/2003 | Sugita et al. ................ 396/541 |
| 6,661,971 B1 * | 12/2003 | Manabe et al. ................ 396/89 |
| 6,714,248 B1 * | 3/2004 | Inoue .......................... 348/372 |
| 6,781,634 B1 * | 8/2004 | Shiozaki et al. ............. 348/374 |
| 2002/0159774 A1 * | 10/2002 | Koyama et al. ............. 396/505 |
| 2003/0142231 A1 * | 7/2003 | Yasuda et al. ............... 348/373 |

* cited by examiner

*Primary Examiner*—Lynn Feild
*Assistant Examiner*—Ingrid Wright
(74) *Attorney, Agent, or Firm*—Lerner, David, Littenberg, Krumholz & Mentlik, LLP

(57) ABSTRACT

A miniaturized electronic device including a battery storing container having an opening for placing a battery in and out, a recording medium storing part for storing a recording medium detachably, and a plurality of circuit boards constituting predetermined circuits, wherein the recording medium storing part and the plurality of circuit boards are placed so as to surround the outside of the battery storing container except at its opening.

1 Claim, 4 Drawing Sheets

ELECTRONIC DEVICE

CROSS REFERENCE TO RELATED APPLICATIONS

The present document is based on Japanese Priority Document JP2002-194455, filed in the Japanese Patent Office on Jul. 3, 2002, the entire contents of which being incorporated herein by reference.

BACKGROUND OF THE INVENTION

1. Field of the Invention

The present invention is related to an electronic device that has a battery storing container with an opening for placing a battery in and out, a recording medium storing part for storing a recording medium detachably and a plurality of circuit boards constituting predetermined circuits.

2. Description of the Related Art

FIGS. 4A and 4B are diagrams explaining a conventional electronic device, 4A is an exploded perspective view and 4B is a plane schematic overhead view. An electronic device 1' is a compact portable A-V device, such as a digital still camera, in which a recoding media connector 3, an image display unit 6 and a main substrate 4 are arranged with a battery case 2 at the center.

In this example, the recording media connector 3 and the main substrate 4 are disposed in piles on a surface substantially perpendicular to an opening 21 of a battery case 2, and the image display unit 6 and other circuit board 7 are disposed side by side on an opposite surface.

Therefore, the thickness A of the electronic device 1 becomes the total thickness of the battery case 2, the recording media connector 3, the main substrate 4 and the image display unit 6.

As a configuration of substrate in an electronic device, the following technologies are disclosed.

<Japanese Patent Application Publication No. H8-37387>

This publication discloses the technology that attempts to miniaturize a device and to improve the heat radiation effect by disposing print boards above and below a cooling wheel.

<Japanese Patent Application Publication No. H10-229288>

This publication discloses the technology that attempts to improve the heat radiation effect by disposing print boards above and below a heating component, such as a transistor, in order to provide holes for ventilation.

<Japanese Patent Application Publication No. 2002-8604>

This publication discloses the technology that can extend a battery operating time by making a heating component to be contacted with a battery through a heat conduction member.

<Japanese Patent Application Publication No. H10-144067>

This publication discloses the technology that can improve the heat radiation effect without decreasing amounting density of a main printed board by mounting a power IC on a substitute printed board which is provided for an amplifier in addition to the main printed broad.

<Japanese Patent Application Publication No. H7-264450>

This publication discloses a heat radiation structure in which printed boards are disposed around a camera housing via a heat conductive rubber.

<Japanese Patent Application Publication No. 2001-60783>

This publication discloses the technology that protects a printed board from heat by disposing a printed board more underneath than a bottom end of a deviation coil of a cathode-ray tube.

SUMMARY OF THE INVENTION

In the conventional electronic device shown in FIG. 4, however, circuit boards are disposed so as to overlap on a battery case and a recording media connector, so that the thickness of the electronic device becomes the total thickness of the battery case, the recording media connector and circuit boards. This is a reason why the electronic device cannot be made thinner.

In addition, the conventional electronic device has a drawback such that the heat tends to stay inside the device without much dissipation because heat sources of a circuit board and a liquid crystal display unit, or the like, are disposed in piles. Further, there is a problem that a battery cannot be warmed up evenly due to presence of empty spaces at above and below inside the battery case.

In addition, the objects of the technologies disclosed in the Japanese Patent Application Publication No. H8-37387, No. H10-229288, No. 2002-8604, No. H10-144067 and No. 2001-60783 are to improve the heat radiation effect and not considered about the battery operating time. Although the technology disclosed in the Japanese Patent Application Publication No. H 7-264450 is the structure for extending the battery operating time, it is unable to warm a battery up evenly.

In order to cope with the above inconvenient, the present invention provides an electronic device which has a battery storing container having an opening for placing a battery in and out, a recording media storing part for containing a recording medium detachably and a plurality of circuit boards constituting predetermined circuits, wherein the recording medium storing part and the plurality of circuit boards are placed so as to surround the outside of the battery case except at its opening.

According to the present invention, the recording medium storing part and the plurality of circuit boards are placed so as to surround the outside of the battery case except at its opening. In other words, the battery case is surrounded by the heat sources, whereby a battery can be warmed up efficiently. Further, because the recording medium storing part and the circuit boards are disposed not to be overlapped each other, the electronic device can be made thinner.

As described above, in the electronic device of the present invention, the thickness thereof is only thickness of the battery storing container, the recording medium storing part and the image display unit, so that the device can be produced thinned. In addition, the heat inside the electronic device can be dissipated efficiently and the temperature rising inside the device can be controlled. Besides, it is possible to extend the battery operation time because the battery can be warmed up efficiently.

DESCRIPTION OF THE PREFERRED EMBODIMENT

Figure 1:
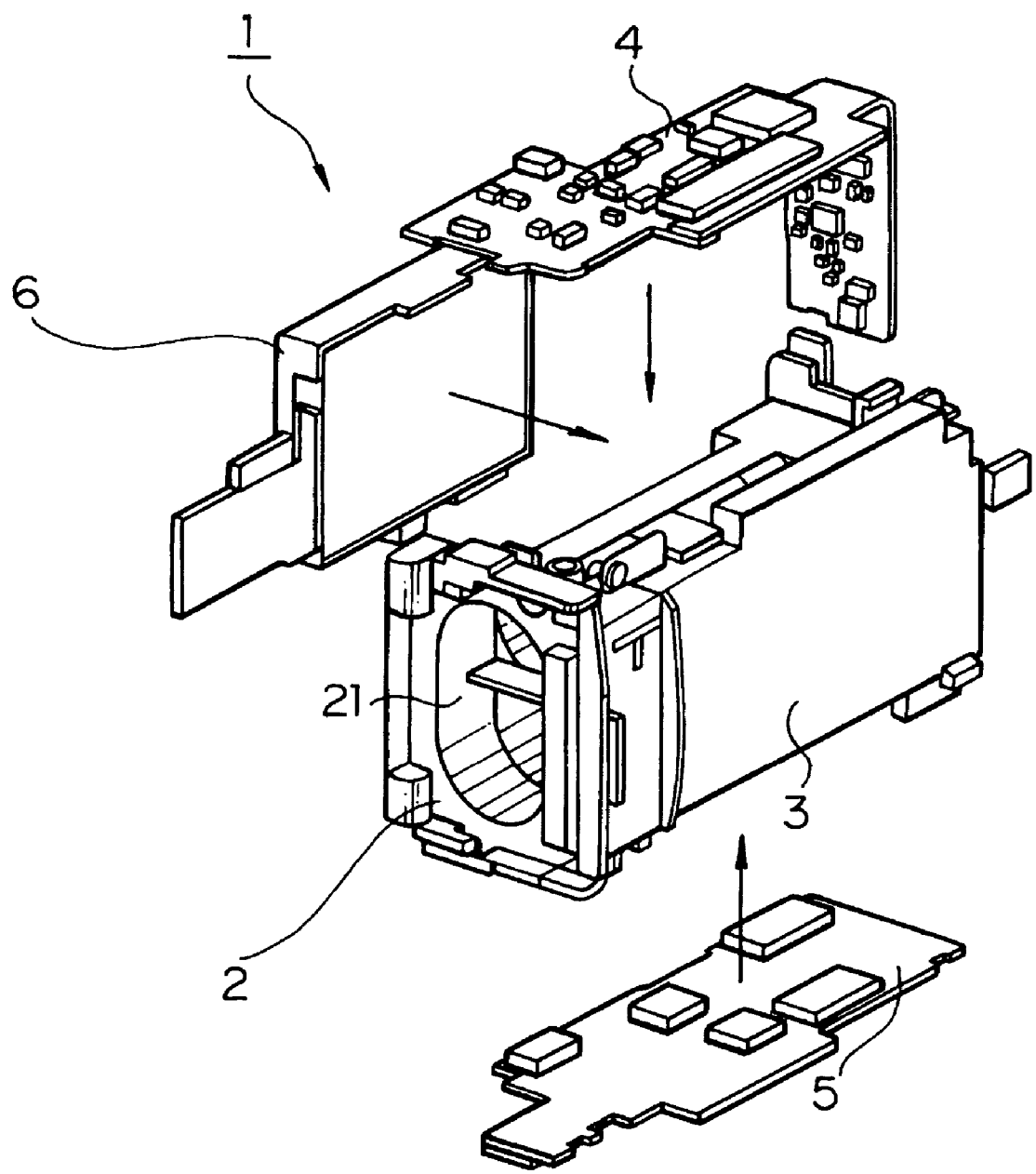
FIG. 1 is an exploded perspective view explaining the present embodiment.

Detailed description of the preferred embodiment of the present invention is explained based on the drawings as follows. FIG. 1 is an exploded perspective view explaining a main portion of an electronic device of the present embodiment. The electronic device 1 is, for example, a digital still camera that includes a battery case (battery storing container) 2 for containing a predetermined sized battery, a recording media connector (recording medium storing part) 3 for storing a recording medium, such as a memory stick (registered trademark), and a plurality of circuit boards constituting predetermined circuits (main substrates 4, 5 and an image display unit 6).

The battery case 2 has an opening 21 for placing a battery in and out and a cover, which is not shown, for the opening. The feature of the present embodiment is that the recording media connector 3 and the circuit boards are disposed so as to surround outside of the battery case 2 except at its opening 21.

In example in FIG. 1, the battery case 2 has six external planes forming thereof. The opening is made in a first external plane, the recording media connector 3 is disposed in a second external plane which is perpendicular to the first external plane, the image display unit 6 is disposed in a third external plane which is parallel to the second external plane, and the main substrates 4, 5 are respectively disposed in other three external planes other than the first to the third external planes.

In such arrangement, the outside of the battery case 2 is surrounded by the recording media connector 3 and the circuit boards 4, 5 and 6, so that a battery contained in the battery case 2 can be warmed up evenly. Therefore, the battery operating time can be extended. In addition, separately disposing the main substrates 4 and 5, which are served as heat sources, enables to suppress the temperature-rise inside the device.

Figure 2A:
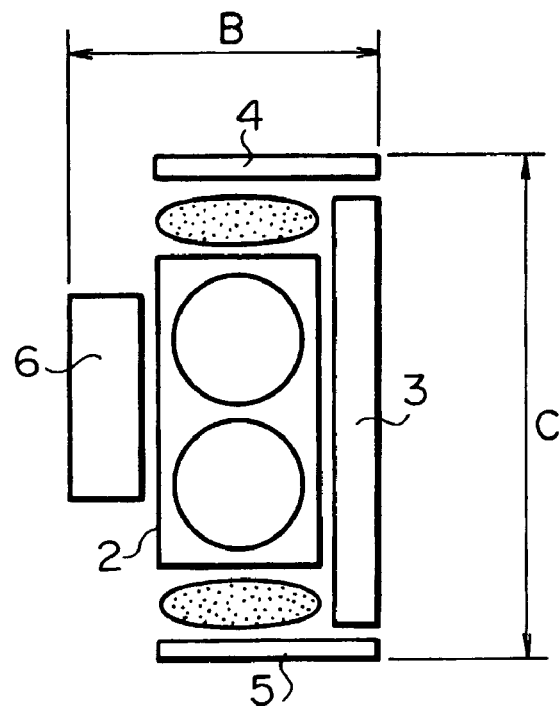
FIG. 2A and FIG. 2B are schematic block diagrams explaining size of an electronic equipment.
Figure 2B:
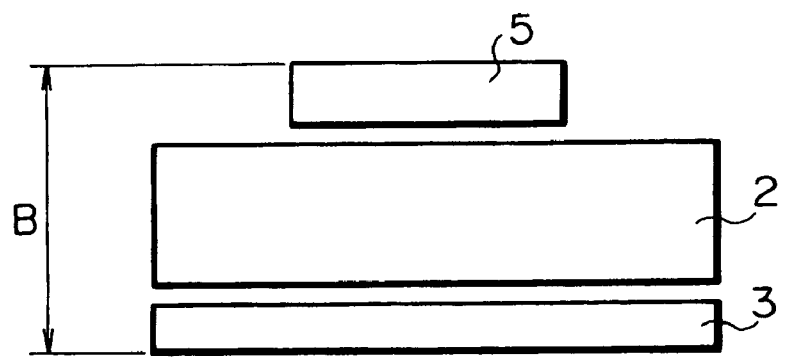

FIGS. 2A and 2B are schematic block diagrams explaining size of the electronic device of the present embodiment, 2A is a plane view from the opening side and 2B is a plane overhead view. When the recording media connector 3 and the image display unit 6 are installed so as to hold the battery case 2 therebetween, the width B of the electronic device is the total thickness of the recording media connector, the battery case and image display unit. The height C of the electronic device is the total of the height of the recording media connector 3 and the thicknesses of main boards 4 and 5.

Therefore, according to the above structure, thickness of the device including the battery case 2 can be suppressed and dead spaces can be used effectively by disposing there the main boards 4 and 5 separately. In this way, the electronic device 1 can be miniaturized.

Figure 3:
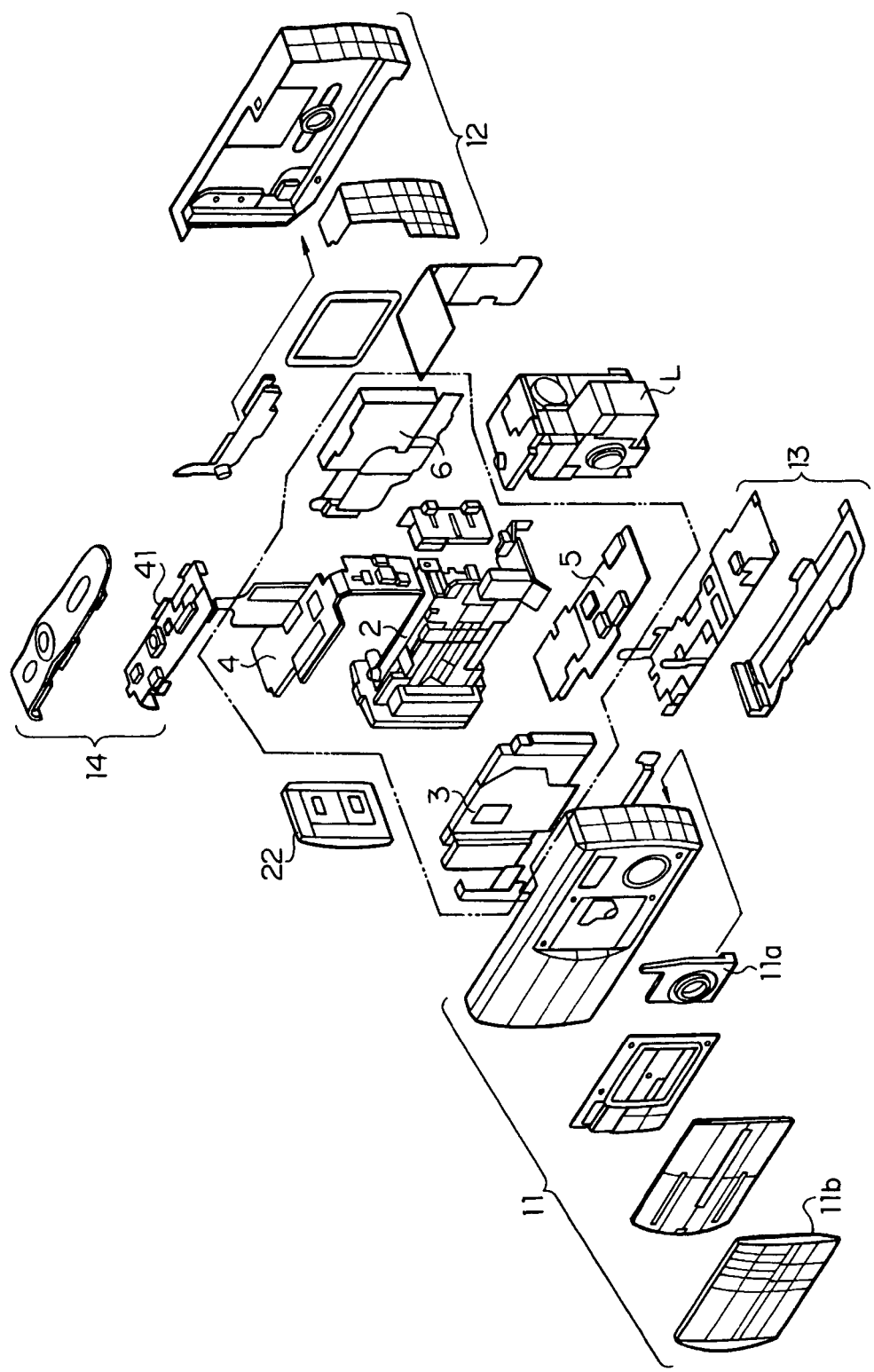
FIG. 3 is an exploded perspective view of an electronic device constituting a digital still camera.
Figure 4A:
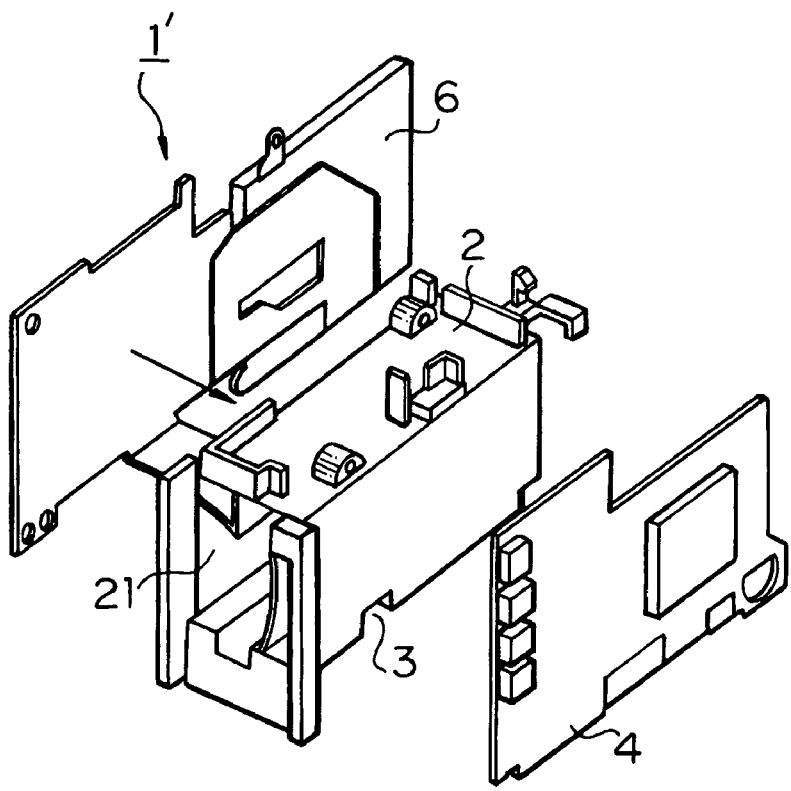
FIG. 4A and FIG. 4B are diagrams explaining a conventional embodiment.
Figure 4B:
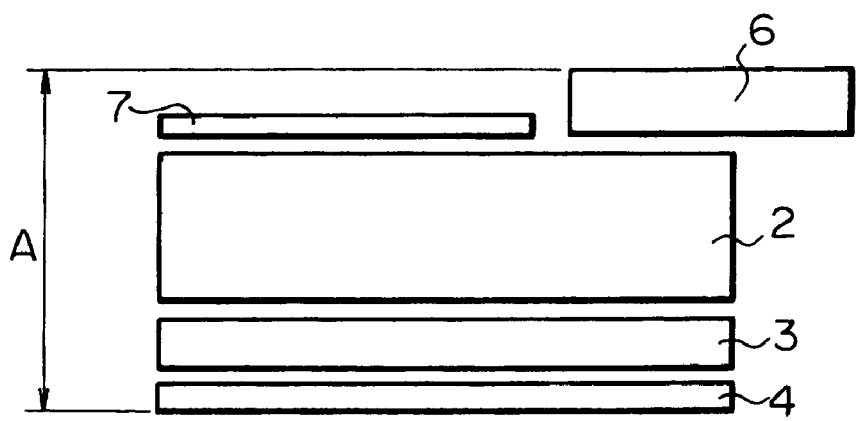

FIG. 3 is an exploded perspective view of the electronic device constituting a digital still camera. In FIG. 3, the main portion shown in FIG. 1 is surrounded with the two-dot chain line. In the digital still camera, a lens unit L is adjacently placed in longitudinal direction of the battery case 2. The digital still camera has a front cabinet 11, a back cabinet 12, a bottom cabinet 13 and a top cabinet 14, which enclose the above described main portion and forms an external appearance thereof. In addition, a cover 22 is disposed at the opening side of the battery case 2.

The front cabinet includes a lens cover 11a and a slide cover 11b. The lens cover 11a is exposed by parallel shifting the slide cover 11b. When taking an image, an action of opening the slide cover 11b makes a switch on.

A switching substrate 41 is provided between the top cabinet 14 and the main substrate 4. Various switches are mounted on the switching substrate 41, and buttons and dials are provided on the top cabinet 14. Different kinds of settings and imaging (shutter action) can be performed with the switches that move in conjunction with the buttons and dials operations.

On the back cabinet 12, an opening corresponding to the image display unit 6 is provided. Images of the image display unit 6 can be monitored through this opening. In addition, various buttons are provided there to operate switches mounted on the substrate of the image display unit 6 for setting the display.

In the electronic device 1 configured as described above, the recording media connector 3 is disposed on the widest area of a housing but the print substrates, such as the main substrates 4 and 5, are not disposed there. Thus, the thickness of the electronic device 1 can be controlled in minimum. In addition, the print substrates are not disposed on the area (the widest area of a housing), where the maximum stress is applied if the electronic device 1 is bent, whereby the print substrates can be prevented from being damaged.

In addition, in the case of the digital still camera, the image display unit 6 is disposed on the back cabinet 12. Accordingly, the position of the image display unit 6 can be arranged more freely since the main boards 4 and 5 are not disposed on the same said.

It should be noted that, although the electronic device 1 constituting the digital still camera is explained as an example in the above mentioned embodiment, the present invention may similarly be applied to other electronic device which has a battery case 2 and a plurality of circuit boards.

The invention claimed is:

1. An electronic device comprising:
   a battery storing container having an opening for placing a battery in and out of the battery storing container,
   a recording medium storing part for detachably storing a recording medium; and
   a plurality of circuit boards constituting predetermined circuits, wherein
   said recording medium storing part and said plurality of circuit boards are placed respectively on separate sides of said battery storing container in a nonoverlapping relationship so as to surround an outside of said battery storing container except at said opening, wherein
   said battery storing container comprises six external planes forming the outside thereof, said opening is made in a first external plane, said recording medium storing part is disposed in a second external plane that is perpendicular to said first external plane, and one of said plurality of circuit boards comprises an image display unit and is disposed in a third external plane that is parallel to said second planar element and said circuit boards other than said image display unit are disposed on three external planes other than said first to third external planes, wherein
   said other three external planes consist of an upper external plane, a bottom external plane and an opposite side external plane opposite said first external plane, and said circuit boards disposed on said upper external plane and said opposite side external plane opposite said first external plane are connected by a predetermined width portion so as to form an L-shape for covering said battery storage container.

* * * * *